Figure 1:
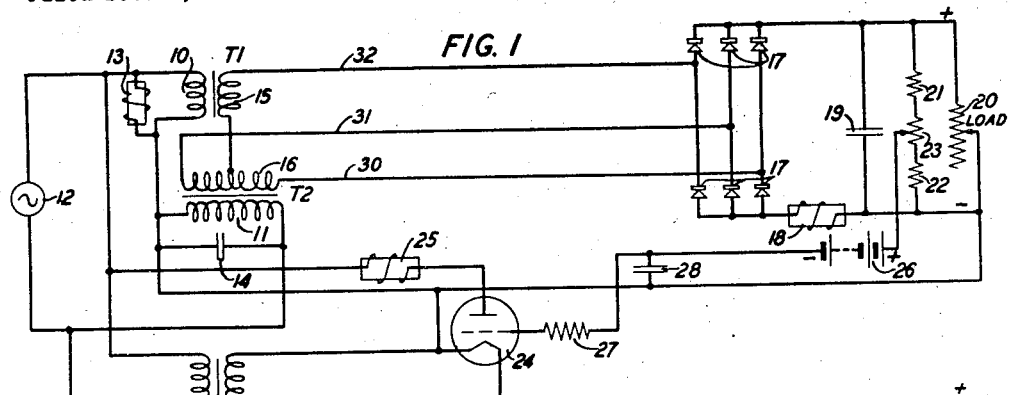

Nov. 9, 1948.   J. A. POTTER   2,453,263
VOLTAGE REGULATION

Filed Feb. 2, 1944   2 Sheets-Sheet 1

INVENTOR
J. A. POTTER
BY
G. F. Heuerman
ATTORNEY

Nov. 9, 1948.    J. A. POTTER    2,453,263
VOLTAGE REGULATION

Filed Feb. 2, 1944    2 Sheets-Sheet 2

INVENTOR
J. A. POTTER
BY
G. F. Heuerman
ATTORNEY

Patented Nov. 9, 1948

2,453,263

UNITED STATES PATENT OFFICE 2,453,263

VOLTAGE REGULATION

James A. Potter, Long Valley, N. J., assignor to Bell Telephone Laboratories, Incorporated, New York, N. Y., a corporation of New York Application February 2, 1944, Serial No. 520,761

14 Claims. (Cl. 175—363)

1

This invention relates to voltage regulation and particularly to rectifying apparatus for supplying direct current at substantially constant voltage to a load.

An object of the invention is to provide improved current supply apparatus having means for minimizing load voltage variations.

It is also an object of the invention to provide a voltage regulated current supply circuit having therein a phase multiplying transformer circuit which is controlled in response to load voltage variations for minimizing or substantially suppressing load voltage variations.

In an embodiment of the invention shown and described herein for the purpose of illustration, there are provided a multiphase bridge rectifier and filter for supplying direct current to a load and a phase multiplying transformer circuit for supplying current from an alternating current supply source to the rectifier. When the alternating current supply voltage is at a minimum value and the load current is at a maximum value the transformer circuit supplies nearly balanced multiphase voltages to the bridge rectifier circuit. An increase in supply voltage or a decrease in load causes the multiphase voltages to become unbalanced, thus tending to decrease the load voltage to compensate for the increase in load voltage which would result due to an increase in supply voltage or a decrease in load if the degree of balance of the multiphase voltages supplied to the rectifier remained fixed. The changes in balancing of the multiphase voltages are due to relative impedance changes of different portions of the phase multiplying transformer circuit caused by current changes in a transformer winding. Means responsive to residual load voltage variations are provided for further reducing the load voltage variations caused by load or supply voltage changes or for reducing load voltage changes due to resistance changes in the portion of the circuit connecting the phase multiplying transformer and the load, for example, resistance changes of the rectifier elements caused by temperature variation or aging, this means likewise functioning to control the current through a transformer winding to change the relative impedances of different portions of the phase multiplying transformer circuit. There may be employed, for example, two transformers having their primary windings connected in series to a single phase supply source and having Scott connected secondary windings connected to a three-phase bridge rectifier, a condenser being connected in shunt with respect to a primary or

2 a secondary winding of one of the transformers, a current path in shunt with respect to the primary winding of one of the transformers and means for varying the impedance of the shunt path in response to load voltage variations for controlling the current through the transformer primary winding. If desired, the transformer which does not have a condenser connected in shunt with its primary or secondary winding may have an inductance element connected in shunt with its primary winding. Alternatively, one of the transformers may have a tertiary winding to which is connected a current path the impedance of which is varied in accordance with load voltage variations. The invention is not limited to the use of a transformer circuit having a single-phase input and a three-phase output connected to a three-phase rectifier. There may be used, for example, a three-phase current supply source and a phase multiplying transformer circuit for multiplying the three-phase input to a nine-phase output which is connected to a nine-phase bridge rectifier.

Fig. 1 of the drawing is a schematic view of a regulated rectifier embodying the invention; and Figs. 2 to 5, inclusive, are schematic views of modifications of the regulated rectifier shown in Fig. 1.

Referring to Fig. 1 of the drawing, there are provided transformers T1 and T2 having primary windings 10 and 11, respectively, connected in series to a single-phase alternating current supply source 12. The primary winding 10 is shunted by an inductance element 13 and the primary winding 11 is shunted by a condenser 14. The secondary transformer windings 15 and 16 are Scott connected, one terminal of winding 15 being connected to a mid-tap of winding 16 and the remaining transformer terminals being connected by means of leads 30, 31 and 32 to a three-phase bridge rectifier comprising rectifier elements 17. The direct current terminals of the bridge rectifier are connected through a filter comprising an inductance element 18 and a condenser 19 to a load 20, the positive terminal of the rectifier being connected directly to the positive load terminal and the negative rectifier terminal being connected through inductance element 18 to the negative load terminal and the condenser 19 being connected across the load. A resistance path comprising resistors 21 and 22 and a potentiometer 23 in series is connected to the load terminals. There is provided an electronic device 24, preferably of the gas-filled type, having an anode, a control electrode and a thermionic cathode to which heating current is supplied from the source 12 through a transformer T3. The space current, or anode-cathode, path of the tube 24 is in a circuit connected in shunt with respect to the primary winding 10 of transformer T1, one terminal of the transformer winding 10 being connected directly to the cathode and the other transformer winding terminal being connected through an inductance element 25 to the anode of the tube. The inductance element 25 is preferably a so-called "swinging choke" such as disclosed in an application of A. Majlinger and B. E. Stevens, Serial No. 466,856, filed November 25, 1942 (United States Patent 2,400,559, granted May 21, 1946), to give smooth control of the current in the tube 24. The inductance element 13 is also preferably a "swinging choke" of this type. The negative load voltage terminal is connected directly to the cathode of tube 24 and the variable tap of potentiometer 23 is connected through a biasing battery 26 and resistor 27 to the control electrode or grid of the tube, a condenser 28 being connected from the cathode to the common terminal of battery 26 and resistor 27. Resistor 27 limits the flow of grid current. Condenser 28 is provided to introduce delay in the input or control circuit of tube 24 to prevent hunting.

It is well known that in a simple rectifying circuit for supplying direct current to a load and having no means for minimizing or substantially eliminating load voltage variations, the load voltage is reduced by any increase in load and the load voltage is increased by any increase in supply voltage. Such a simple circuit might consist of a single-phase transformer for connecting a single-phase alternating current source to a single-phase bridge rectifier and a filter circuit for connecting the rectifier to a load. A partial compensation for load voltage variations would be effected in a circuit like that shown in Fig. 1 but with the compensating circuit comprising the electronic tube 24 omitted. When the voltage of source 12 is at a minimum operating value and the load, that is, the current flowing through the load resistor 20, is at a maximum value, nearly balanced three-phase voltage is supplied from the Scott connected secondary windings of transformers T1 and T2 to the three-phase bridge rectifier. For this condition the voltage across the primary winding 10 of transformer T1 and inductance element 13 in parallel therewith leads the current from the source 12 by about 45 degrees and the voltage across the primary winding 11 of transformer T2 having condenser 14 in parallel therewith lags the current from the source 12 by about 45 degrees. When the load is decreased by increasing the resistance of load resistor 20, the impedance of the portion of the circuit consisting of winding 11 and condenser 14 connected in parallel increases, said impedance becoming less capacitive and more resistive. For this condition of decreased load, the voltage across the primary winding 11 of transformer T2 increases in magnitude and becomes less lagging with respect to the current in the circuit and the voltage across the primary winding 10 of transformer T1 decreases. For light loads, therefore, the three-phase voltages supplied to the rectifier are unbalanced, the voltage across leads 30 and 31 being larger than the voltage for the full load condition and the voltages across leads 31 and 32 and across leads 30 and 32 being smaller than the corresponding voltages for the full load condition. This unbalancing of the three-phase voltages supplied to the rectifier results in a reduction of the load voltage, thus minimizing the change in load voltage.

Similarly, when the voltage of source 12 rises, for example, the impedance of the portion of the circuit consisting of winding 11 and condenser 14 in parallel increases to cause the voltages across the windings 11 and 16, respectively, of transformer T2 to increase and the voltages across windings 10 and 15, respectively, of transformer T1 to decrease. The three-phase voltages supplied to the rectifier therefore become unbalanced to decrease the load voltage, thus tending to prevent a rise in load voltage which would result if the three-phase voltages remained balanced.

The changes of balance of the three-phase voltages resulting from load changes or supply voltage changes do not entirely prevent load voltage changes. A regulating circuit comprising electronic device 24 responsive to residual changes in load voltage is therefore provided for effecting a further reduction in load voltage variations. When there is an increase in load voltage, for example, the control grid of tube 24 becomes relatively more positive with respect to its cathode to cause the impedance of the anode-cathode path of the tube to decrease. The impedance of the portion of the circuit having winding 10 in one of the three parallel branches, inductance element 13 in a second branch and the anode-cathode path of tube 24 and inductance element 25 in series in a third branch is therefore decreased and the impedance of the portion of the circuit comprising winding 11 and condenser 14 is increased. Therefore, the three-phase voltages become unbalanced to further limit or substantially prevent the rise in load voltage.

The use of the regulating circuit which is controlled by load voltage variations not only increases the effectiveness of the load voltage regulation produced as the result of impedance changes in the phase multiplying transformer circuit, but the regulating circuit also serves to control the phase multiplying transformer circuit to effect a reduction in load voltage variations which cannot be compensated for even in part by the transformer circuit per se without the control of the regulating circuit. Assume, for example, that the resistance of the rectifier elements 17 increases due to aging or a reduction in temperature. As a result the current flowing through the load resistor 20 will decrease to cause a reduction in load voltage. This decrease in current will cause the voltages across the windings of transformer T2 to increase and the voltages across the windings of transformer T1 to decrease to unbalance the three-phase voltages supplied to the rectifier to further reduce the load voltage. Therefore, a change in load voltage due to a resistance change in the circuit connecting the phase multiplying transformers with the load cannot be compensated for by the phase multiplying transformer circuit per se but the load voltage changes would be increased due to the change in balance of the three-phase voltages effected by the phase multiplying transformer. However, a decrease in load voltage resulting from an increase of the resistance of the rectifier elements, for example, will cause the anode-cathode impedance of tube 24 to increase. The impedance of the portion of the circuit consisting of winding 11 and condenser 14 in parallel will thus be reduced to cause the voltage across the transformer windng 11 to decrease and that across winding 10 to increase. The three-phase voltages are thus brought more nearly into balance and, as a result, the load voltage is increased to compensate for the reduction in load voltage due to the increase in resistance in the circuit connecting the phase multiplying transformer with the load. An initial adjustment of the load voltage to a desired value may be made by changing the setting of the variable tap of potentiometer 23 for changing the bias of the grid of tube 24 with respect to its cathode.

Figure 2:
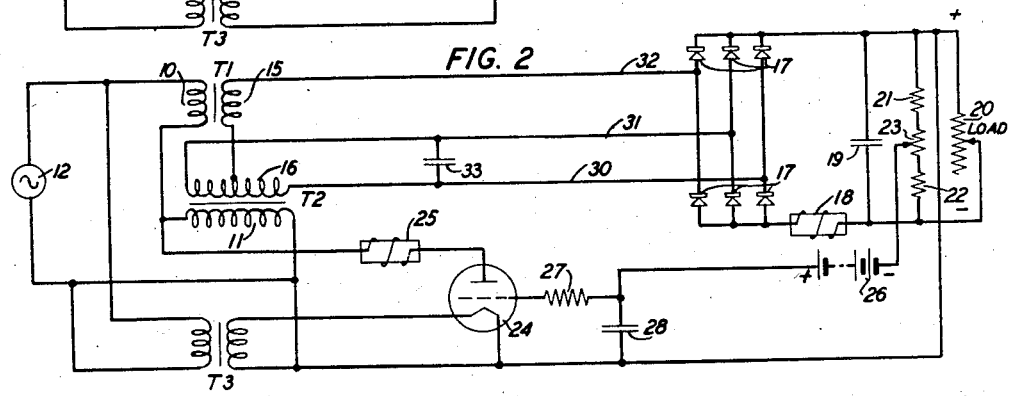

The circuit shown in Fig. 2 is a modification of the circuit shown in Fig. 1 and the corresponding parts of the two figures have the same designations. The two figures differ in the following respects. The inductance element 13 shown in Fig. 1 is omitted from Fig. 2, the winding 10 of transformer T1 having the inductance required for satisfactory operation. Instead of connecting a condenser 14 in shunt with the primary winding 11 of transformer T2 as shown in Fig. 1, a condenser 33 of Fig. 2 is connected across the leads 30 and 31 going to the terminals of the secondary winding 16 of transformer T2. In Fig. 2 the cathode of tube 24 is connected to the positive load terminal instead of being connected to the negative load terminal as in Fig. 1 and the biasing battery 26 of Fig. 2 is reversed in polarity with respect to that of the battery 26 of Fig. 1. In Fig. 2 the current path comprising inductance element 25 and the anode-cathode path of tube 24 is connected in shunt with winding 11 of transformer T2 instead of being connected in shunt with winding 10 of transformer T1 as shown in Fig. 1.

In Fig. 2 the three-phase voltages impressed upon the three-phase bridge rectifier by way of the leads 30, 31 and 32 are nearly balanced when the load is a maximum and the supply voltage from source 12 has a minimum amplitude. When the load is decreased, the impedance of the portion of the circuit consisting of winding 16 and condenser 33 in shunt therewith increases, this impedance becoming more resistive and less capacitive. The voltage across leads 30 and 31 therefore increases while the voltage across leads 31 and 32 and the voltage across leads 30 and 32 decreases, thus reducing or minimizing the rise in load voltage. A similar action takes place when the voltage of source 12 rises. Residual load voltage changes due to load variations or supply voltage variations and load voltage changes due to other causes, such as impedance changes in the circuit connecting the transformers T1 and T2 with the load, are reduced or substantially eliminated due to the action of the regulating circuit comprising the electronic tube 24. An increase in load voltage, for example, will make the grid of tube 24 relatively more negative to increase the anode-cathode impedance of the tube and therefore to increase the impedance of the shunt path across winding 11. As a result the impedance of the secondary winding 16 is decreased, the voltage across leads 30 and 31 is increased and the voltages of the other two phases are decreased to decrease the load voltage, thus minimizing or substantially preventing a rise in load voltage.

Figure 3:
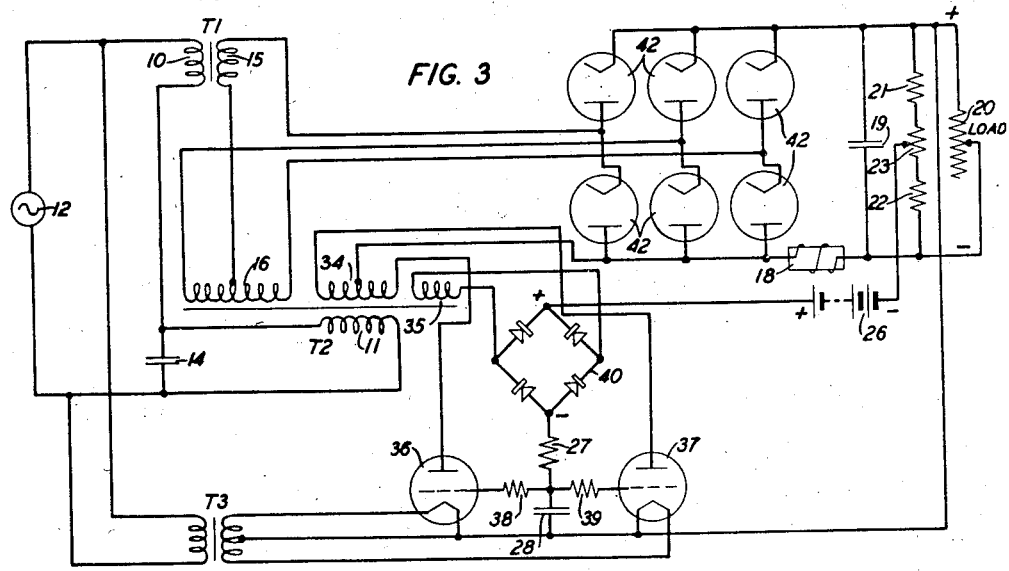

Fig. 3 shows a further modification of the regulated rectifier circuits of Figs. 1 and 2 and the corresponding parts of Fig. 3 have the same designations as in Figs. 1 and 2. Diode electronic rectifier tubes 42 are used in the rectifier bridge circuit of Fig. 3 instead of the disc type rectifiers used in the preceding circuits. The transformer T2 is provided with windings 34 and 35 in addition to the primary winding 11 and the secondary winding 16. A full-wave rectifier comprising gas-filled tubes 36 and 37 is provided, each having an anode, a cathode and a control electrode. The cathodes of these tubes are supplied with heating current from the transformer T3. The end terminals of transformer windings 34 are connected to the anodes of tubes 36 and 37, respectively. The cathodes are connected to the positive load terminal. The mid-tap of transformer winding 34 is connected through inductance element 18 to the negative load voltage terminal. The variable tap of potentiometer 23 is connected through grid biasing battery 26 to the positive direct current terminal of a bridge rectifier 40, the negative terminal of which is connected through resistors 27 and 38 to the control grid of tube 36 and through resistors 27 and 39 to the control grid of tube 37. The alternating current terminals of the rectifier 40 are connected to the transformer winding 35 so that, when the voltage of source 12 increases, for example, the grids of tubes 36 and 37 are biased relatively more negatively to compensate for the increased voltage impressed upon the anodes of the tubes from transformer winding 34. It will be noted that in this circuit the direct component of the current flowing through the rectifier tubes 36 and 37 is made useful in that it flows through the load, the alternating or ripple component being suppressed by the filter 18, 19. In this circuit, as in the preceding circuits, a part of the load voltage regulation is due to the regulating action of the phase multiplying transformer circuit per se. Precise regulation is due to the regulating circuit comprising tubes 36 and 37 having their anode-cathode paths connected in circuit with transformer winding 34. When there is a small increase in load voltage, for example, the grids of tubes 36 and 37 are biased relatively more negatively, thus increasing the anode-cathode impedances of tubes 36 and 37. The current in tertiary winding 34 is therefore decreased to increase the impedance of the portion of the circuit consisting of winding 11 and condenser 14 in parallel. The voltages across the primary and secondary windings, respectively, of transformer T2 are therefore increased and the voltages across the windings of transformer T1 are decreased to decrease the load voltage and thus compensate for the initially assumed increase in load voltage.

Figure 4:
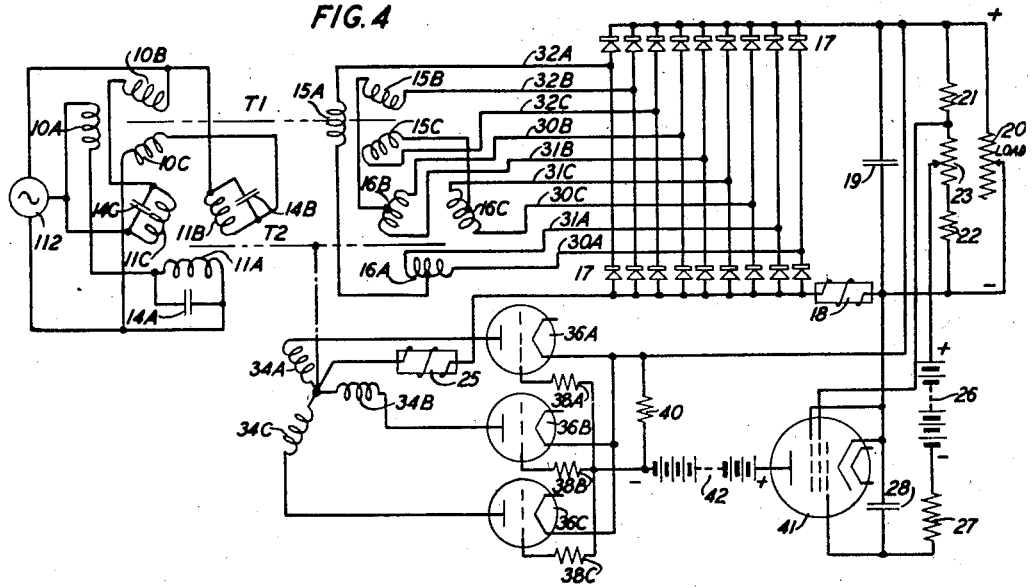

Fig. 4 is a modification of the circuit shown in Fig. 3 in which current from a three-phase supply source 112 is supplied through the phase multiplying transformer circuit comprising transformers T1 and T2 to a nine-phase bridge rectifier comprising rectifier elements 17. The transformer T1 has primary windings 10A, 10B and 10C and secondary windings 15A, 15B and 15C. Transformer T2 has primary windings 11A, 11B and 11C shunted by condensers 14A, 14B and 14C, respectively, secondary windings 16A, 16B and 16C and tertiary windings 34A, 34B and 34C. Primary winding 10A of transformer T1 and primary winding 11A of transformer T2 are connected in series to one phase of the three-phase supply source and the other primary windings of these transformers are similarly connected to the other phases of the source 112. One terminal of secondary winding 15A of transformer T1 is connected to lead 32A going to the nine-phase bridge rectifier and its other terminal is connected to a mid-tap of secondary winding 16A of transformer T2. The end terminals of windings 16A are connected, respectively to leads 30A and 31A going to the rectifier bridge. Secondary transformer windings 15B, and 16B are similarly connected to leads 31B and 32B while secondary transformer windings 15C and 16C are similarly connected to leads 30C, 31C and 32C, all connected to the bridge rectifier.

The portion of the phase multiplying transformer circuit comprising transformer windings 10A, 11A, 15A and 16A and condenser 14A energized from one of the phases of the source 112 will supply three-phase current to the bridge rectifier by way of leads 30A, 31A and 32A, this portion of the circuit functioning similarly to the phase multiplying transformer circuit comprising windings 10, 11, 15, 16 and condenser 14 of Fig. 3. A phase multiplying action is similarly performed by the group of elements comprising windings 10B, 11B, 15B and 16B and condenser 14B receiving energy from a second phase of the supply source and by the group of elements comprising windings 10C, 11C, 15C and 16C and condenser 14C receiving energy from a third phase of the supply source. Thus substantially balanced nine-phase voltages are impressed upon the rectifier circuit when the load is at a maximum and when the three-phase voltages of the supply source 112 are at a minimum. When the load is decreased from its maximum value or if the voltages of source 112 are increased from a minimum value, the secondary voltages across leads 30A, 31A, across leads 30B, 31B and across leads 30C, 31C are increased and the voltages of the remaining phases are decreased. Such changes in balance of the nine-phase voltages have the effect of reducing load voltage changes due to load changes and supply voltage changes.

Residual load voltage changes, whether due to changes in supply voltage or load or to some other cause such as a resistance change in the rectifier circuit, are reduced or substantially eliminated due to the action of the regulating circuit comprising an amplifier tube 41 and gas-filled rectifier tubes 36A, 36B and 36C. The star-connected windings 34A, 34B and 34C of transformer T2, have their common terminal connected through inductance elements 25 and 18 to the negative load voltage terminal and the other terminals of these windings are connected, respectively, to the anodes of tubes 36A, 36B and 36C. The cathodes of these tubes to which heating current is supplied from any suitable source, not shown, are connected to the positive load voltage terminal. The control grids of the rectifier tubes are connected through resistors 38A, 38B and 38C, respectively, to one terminal of a resistor 40, the other terminal of which is connected to the cathodes of the tubes. The average current flowing through each of the windings 34A, 34B and 34C is therefore controlled in accordance with the voltage drop across resistor 40 produced by the anode-cathode current of tube 41 flowing through the resistor. The anode-cathode path of amplifier tube 41 may be traced from the positive terminal of battery 42 to the anode of the tube and from its cathode through the load and through the resistor 40 to the negative terminal of battery 42. The control grid of tube 41 is connected through resistor 27 and biasing battery 26 to the variable tap of potentiometer 23 and the cathode of this tube is connected to the negative load voltage terminal. The tube 41 has a screen grid which receives its potential from a connection to the common terminal of resistor 21 and potentiometer 23. One plate of a condenser 28 is connected to the cathode and the other plate of the condenser to the control grid of tube 41.

When the load voltage rises above its normal value, the control grid of tube 41 becomes relatively more positive with respect to its cathode to cause the anode current flowing through resistor 40 to increase. The control grids of rectifier tubes 36A, 36B and 36C thus become relatively more negative with respect to their cathodes to cause the current flowing through the transformer windings 34A, 34B and 34C to decrease and the impedance of each of the primary windings 11A, 11B and 11C to decrease. The voltages across secondary windings 16A, 16B and 16C are thus increased and the voltages across windings 15A, 15B and 15C are reduced to cause the load voltage to decrease to its normal value.

Figure 5:
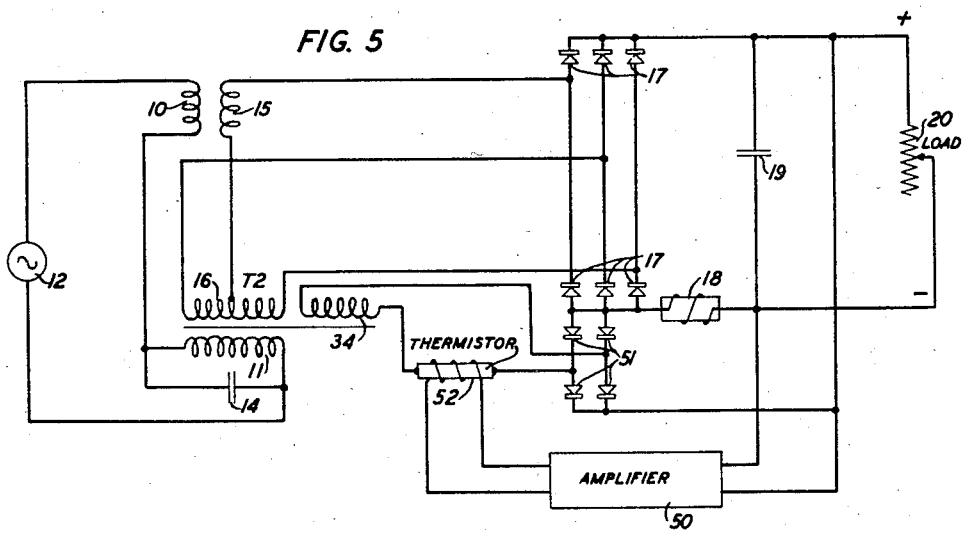

Fig. 5 shows another modification of the circuit shown in Fig. 3. In this circuit the tertiary winding 34 of transformer T2 is connected through a thermistor 52 to the alternating current terminals of a bridge rectifier comprising rectifying elements 51. The positive direct current terminal of this bridge rectifier is connected to the positive load terminal and the negative terminal of the bridge rectifier 51 is connected through inductance element 18 to the negative load voltage terminal. The current through winding 34 is controlled in accordance with the current supplied to the thermistor heater from the output circuit of an amplifier 50, the input circuit of which is connected across the load terminals. The amplifier 50 is designated to cause the current through the thermistor heater to decrease in response to a rise in load voltage to cause the resistance of the thermistor to rise and the current through winding 34 to decrease. As in Fig. 3, when there is a rise in load voltage, the current through the winding 34 is decreased. This has the result of decreasing the current supplied to the load from the rectifier 51 and of decreasing the impedance of winding 11 to cause the voltage across winding 16 to increase and that across winding 15 to decrease to reduce the load voltage. The load voltage is thus restored to its normal value.

The batteries 26 and 42 are shown in the drawing for simplicity. As known to those skilled in the art, battery 42 can be replaced by a small auxiliary rectifier and a regulated rectifier producing a constant voltage can be used in place of battery 26 to furnish a source of reference voltage.

What is claimed is:

1. The combination with a circuit for connecting an alternating current supply source to a load, of a first means connected between said supply source and the remainder of said circuit for changing said alternating supply current into alternating current having an increased number of phases, said means causing the voltages of said increased phases to vary with respect to each other to minimize load voltage variations due to load changes and voltage changes of said source, a second means the impedance of which may vary connected in said circuit between said first means and said load, a third means responsive to a voltage impressed thereon for controlling said first means, and means connected across said load for deriving and impressing upon said third means a voltage proportional to the load voltage for causing the reduction of load voltage variations due to the impedance variations of said second means.

2. In combination, a multiphase rectifier for supplying current to a load, phase multiplying transformer means having a plurality of primary circuits connected to different phases respectively, of a multiphase alternating current supply source a plurality of corresponding secondary circuits for impressing upon said rectifier multiphase voltages having a greater number of phases than the phases of said current source and a plurality of star-connected tertiary windings one for each of the phases of said source in which currents are caused to flow for controlling the relative amplitudes of the multiphase voltages impressed upon said rectifier, a plurality of auxiliary rectifiers, a plurality of circuits including said auxiliary rectifiers, respectively, and said load connected to said tertiary windings, respectively, and means under control of a portion at least of the load voltage for controlling said auxiliary rectifiers to control the currents in said tertiary windings, thereby causing the relative amplitudes of the multiphase voltages impressed upon the multiphase rectifier to vary in response to load voltage variations for minimizing said load voltage variations.

3. In combination with a multiphase rectifier for supplying direct current to a load, of two transformers having a plurality of windings including primary windings to which single phase current is supplied from an alternating current supply source and Scott-connected secondary windings for impressing three-phase voltages upon said rectifier, a condenser being connected in shunt with respect to one of the primary and secondary windings of one of said transformers, a tertiary winding for said one transformer, the relative amplitudes of the three-phase voltages varying in response to current changes in the transformer windings due to load changes and supply voltage changes to reduce resulting load voltage variations and means responsive to load voltage changes for controlling the current in a winding of said transformers for further reducing load voltage changes, said means comprising variable impedance means connected to said tertiary windings and means responsive to load voltage variations for varying the impedance of said variable impedance means.

4. In combination with a multiphase rectifier for supplying direct current to a load, of two transformers having a plurality of windings including primary windings to which single phase current is supplied from an alternating current supply source and Scott-connected secondary windings for impressing three-phase voltages upon said rectifier, a condenser being connected in shunt with respect to one of the primary and secondary windings of one of said transformers, a tertiary winding for said one transformer, the relative amplitudes of the three-phase voltages varying in response to current changes in the transformer windings due to load changes and supply voltage changes to reduce resulting load voltage variations and means responsive to load voltage changes for controlling the current in a winding of said transformers for further reducing load voltage changes, said means comprising a circuit connected to said tertiary winding including rectifying means and said load and means for controlling the current in said circuit in accordance with load voltage variations.

5. In combination with a multiphase rectifier for supplying direct current to a load, of two transformers having a plurality of windings including primary windings to which single phase current is supplied from an alternating current supply source and Scott-connected secondary windings for impressing three-phase voltages upon said rectifier, a condenser being connected in shunt with respect to one of the primary and secondary windings of one of said transformers, a tertiary winding for said one transformer, the relative amplitudes of the three-phase voltages varying in response to current changes in the transformer windings due to load changes and supply voltage changes to reduce resulting load voltage variations, variable impedance means, means responsive to load voltage changes for controlling the current in a winding of said transformers for further reducing load voltage changes, said means comprising a circuit connected to said tertiary winding including rectifying means, said load and said variable impedance means, and means responsive to load voltage for controlling the impedance of said variable impedance means in accordance with load voltage variations.

6. In combination with a multiphase rectifier for supplying direct current to a load, of two transformers having a plurality of windings including primary windings to which single phase current is supplied from an alternating current supply source and Scott-connected secondary windings for impressing three-phase voltages upon said rectifier, a condenser being connected in shunt with respect to one of the primary and secondary windings of one of said transformers, a tertiary winding for said one transformer, the relative amplitudes of the three-phase voltages varying in response to current changes in the transformer windings due to load changes and supply voltage changes to reduce resulting load voltage variations and means responsive to load voltage changes for controlling the current in a winding of said transformers for further reducing load voltage changes, said means comprising a circuit connected to said tertiary winding including rectifying means, said load and a thermistor, said thermistor having a heater winding, an amplifier, means for connecting the input of said amplifier to said load circuit and means for connecting the output of said amplifier to said thermistor heater winding.

7. In combination, means for supplying current to a load comprising phase multiplying transformer means having a plurality of windings including a primary winding to which current is supplied from an alternating current source, a space discharge device having a space current path and space current control means for controlling the current in said path, means comprising said space discharge device for causing current in one of said plurality of said windings to vary in response to changes of space current in said path and means for deriving and impressing upon said control means a voltage which varies in accordance with load voltage changes for controlling the space current in said path and thereby controlling the current in said one winding to cause said load voltage changes to be minimized.

8. A combination in accordance with claim 1 in which said first means in a phase multiplying transformer means having a plurality of windings including primary windings connected to said alternating current source and secondary windings connected to said second means.

9. A combination in accordance with claim 1 in which said second means is a rectifier.

10. A combination in accordance with claim 1 in which said first means is a phase multiplying transformer means having a plurality of windings including primary windings connected to said alternating current source and secondary windings connected to said second means, in which said second means is a rectifier and in which said third means comprises means for controlling the current supplied to one of said plurality of windings.

11. A combination in accordance with claim 3 in which said variable impedance means comprises the space current path of a space current device having an anode, a cathode and a control electrode and in which the means responsive to load voltage variations for varying the impedance of said variable impedance means comprises a circuit connecting said control electrode and said cathode and means for impressing upon said circuit a voltage proportional to the load voltage.

12. A combination in accordance with claim 7 in which said means for supplying current to a load comprises a multiphase rectifier and in which said phase multiplying transformer means comprises a secondary winding for supplying current to said rectifier.

13. In combination, rectifying means for rectifying multiphase alternating current supplied thereto and for supplying the rectified current to a load which may vary over an operating range from a minimum to a maximum load, an alternating current supply source the voltage of which may vary over an operating range from a minimum to a maximum voltage, a first means connected between said supply source and said rectifier for changing said alternating supply current into alternating current having an increased number of phases, said means supplying substantially balanced multiphase voltages to said rectifier under conditions of maximum load and minimum voltage of said supply source, the voltage across the load increasing in response to a decrease of load and vice versa and said load voltage increasing in response to an increase of voltage of said supply source and vice versa, control means responsive to a voltage impressed thereon for controlling said first means, and means connected across said load for deriving and impressing upon said control means a voltage proportional to load voltage to cause said multiphase voltages to become increasingly unbalanced as the load is decreased over the load operating range and vice versa for all operating values of supply source voltage and to cause said multiphase voltages to become increasingly unbalanced as the voltage of said supply source is increased over the operating range of supply source voltage and vice versa for all values of load in the operating range.

14. A combination in accordance with claim 13 in which said first means comprises two transformers having a plurality of windings including primary windings to which single phase current is supplied from said alternating current source and Scott-connected secondary windings for impressing three-phase voltages upon said rectifier.

JAMES A. POTTER.

REFERENCES CITED

The following references are of record in the file of this patent:

UNITED STATES PATENTS

| Number | Name | Date |
|---|---|---|
| 2,018,348 | Dijksterhis | Oct. 22, 1935 |
| 2,079,500 | Foos | May 4, 1937 |
| 2,206,123 | Rinia | July 2, 1940 |
| 2,331,131 | Moyer | Oct. 5, 1943 |
| 2,364,558 | Stocker | Dec. 5, 1944 |

FOREIGN PATENTS

| Number | Country | Date |
|---|---|---|
| 546,976 | Great Britain | Aug. 7, 1942 |